US009933271B2

(12) United States Patent
Magazinik et al.

(10) Patent No.: US 9,933,271 B2
(45) Date of Patent: Apr. 3, 2018

(54) SYSTEM FOR DIRECTING A DRIVER TO A PASSENGER BASED ON A DESTINATION LOCATION SPECIFIED BY THE DRIVER

(71) Applicant: GT Gettaxi Limited, Limassol (CY)

(72) Inventors: Igor Magazinik, Ramat Gan (IL); Talmon Marco, Tel Aviv (IL); Sunny Marueli, Nes Ziona (IL); Ofer Samocha, Rishon Le-Zion (IL); Ziv Haparnas, Bellevue, WA (US)

(73) Assignee: GT Gettaxi Limited, Limassol (CY)

( * ) Notice: Subject to any disclaimer, the term of this patent is extended or adjusted under 35 U.S.C. 154(b) by 22 days.

(21) Appl. No.: 14/832,717

(22) Filed: Aug. 21, 2015

(65) Prior Publication Data

US 2017/0052034 A1     Feb. 23, 2017

(51) Int. Cl.
*G01C 21/34*      (2006.01)
*G08G 1/00*      (2006.01)
*G06Q 10/04*     (2012.01)
*G01C 21/36*     (2006.01)

(52) U.S. Cl.
CPC ..... *G01C 21/3438* (2013.01); *G01C 21/3484* (2013.01); *G01C 21/362* (2013.01); *G06Q 10/047* (2013.01); *G08G 1/202* (2013.01)

(58) Field of Classification Search
CPC ............. G01C 21/3438; G01C 21/343; G01C 21/3492; G06Q 10/025; G06Q 10/047; G06Q 50/30; G08G 1/202; G08G 1/207
See application file for complete search history.

(56) References Cited

U.S. PATENT DOCUMENTS

| | | | |
|---|---|---|---|
| 9,140,570 B1 * | 9/2015 | Baird | G01C 21/3446 |
| 2011/0040603 A1 * | 2/2011 | Wolfe | G06Q 30/02 705/7.31 |
| 2016/0247109 A1 * | 8/2016 | Scicluna | G06Q 10/06315 |
| 2016/0356615 A1 * | 12/2016 | Arata | G06Q 50/30 |

* cited by examiner

*Primary Examiner* — Spencer D Patton
(74) *Attorney, Agent, or Firm* — Lowenstein Sandler LLP

(57) ABSTRACT

In one embodiment an indication of a driver destination location is received from a driver associated with a taxi service. The driver destination location specifies a location that the driver desires to travel to after transporting one or more passengers. A passenger pick-up location of a first passenger is provided. The first passenger is selected based on the driver destination location and a destination location specified by the first passenger.

20 Claims, 5 Drawing Sheets

SYSTEM FOR DIRECTING A DRIVER TO A PASSENGER BASED ON A DESTINATION LOCATION SPECIFIED BY THE DRIVER

TECHNICAL FIELD

This disclosure relates in general to the field of mobile applications and, more particularly, to a system for directing a driver to a passenger based on a destination location specified by the driver.

BACKGROUND

A taxi service may utilize a plurality of drivers that fulfill passenger requests for transportation. A taxi service may provide one or more mobile applications that facilitate the efficient pairing of passengers and drivers. The taxi service may receive a passenger request and select a driver to fulfill the request based on information associated with the passenger request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment an indication of a driver destination location is received from a driver associated with a taxi service. The driver destination location specifies a location that the driver desires to travel to after transporting one or more passengers. A passenger pick-up location of a first passenger is provided. The first passenger is selected based on the driver destination location and a destination location specified by the first passenger.

Example Embodiments

Figure 1:
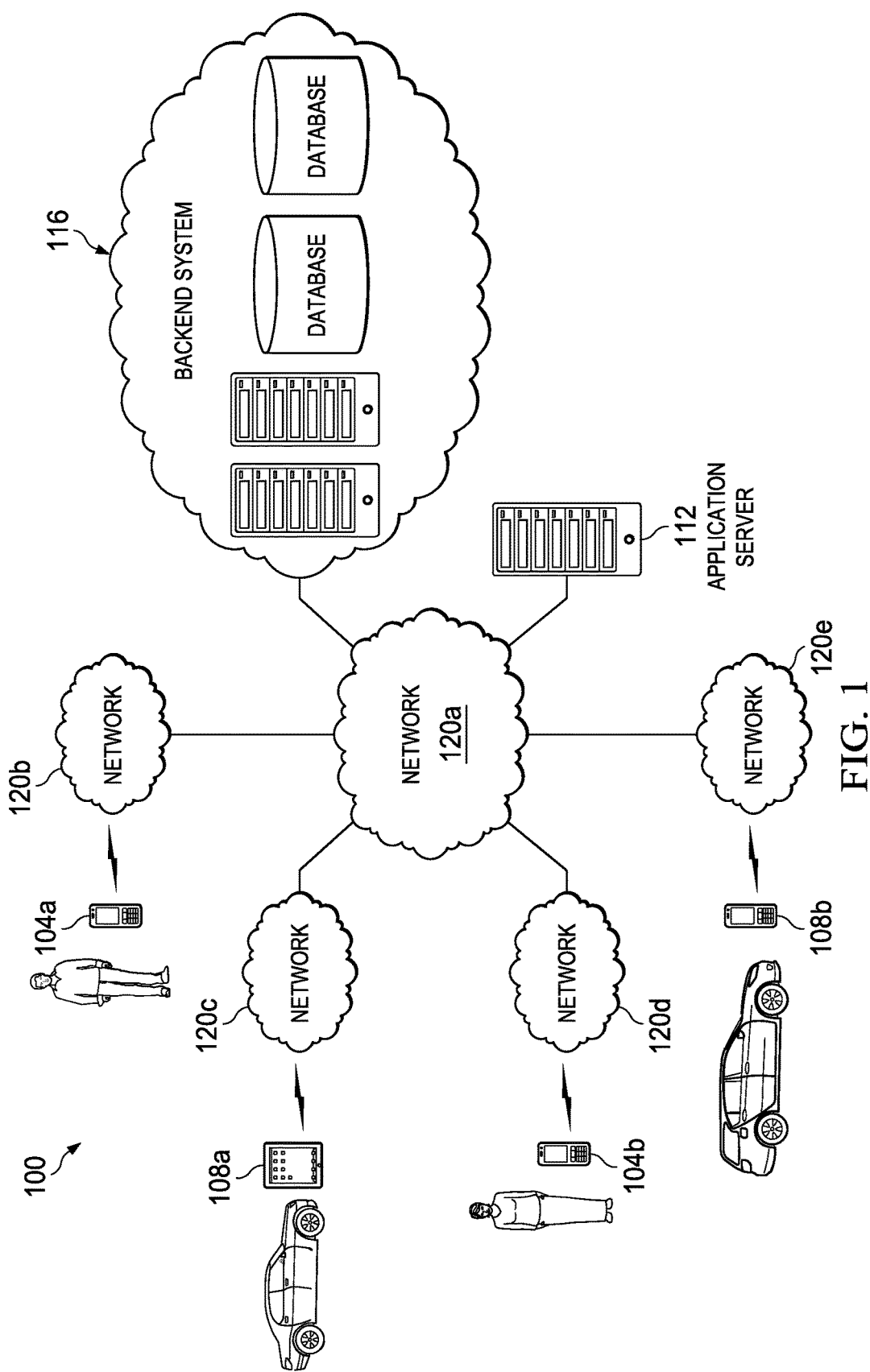
FIG. 1 illustrates a block diagram of a system for directing a driver to a passenger based on the driver's destination location in accordance with certain embodiments.

FIG. 1 illustrates a block diagram of a system 100 for directing a driver to a passenger based on the driver's final destination in accordance with certain embodiments. Although various embodiments may include any number of drivers, passengers, and associated devices, system 100 depicts two passengers having associated passenger mobile devices 104 and two drivers having associated driver mobile devices 108. The mobile devices are coupled through various networks 120 to an application server 112 and a backend system 116.

Various embodiments of the present disclosure may enhance the experience of a driver associated with a taxi service. For example, the driver may specify a destination location (e.g., the driver's home) to which the driver desires to travel as the driver transports fare paying passengers. In some embodiments, the driver may also specify a particular time by which the driver would like to arrive at the destination location. In various embodiments, passengers may be selected for the driver based on the destination location and/or time specified by the driver. In some embodiments, if passengers are not immediately available, the driver may be directed to regions in which passengers requesting routes towards the driver's destination location are likely to materialize.

Mobile devices 104 and 108 may include any electronic computing device operable to receive, transmit, process, and store any appropriate data. For example, mobile devices 104 and 108 may include laptop computers, tablet computers, smartphones, personal digital assistants, and other devices capable of connecting (e.g., wirelessly) to one or more networks 120. Mobile devices 104 and 108 may include a set of programs such as operating systems (e.g., Microsoft Windows, Linux, Android, Mac OSX, Apple iOS, UNIX, or similar operating system), applications, plug-ins, applets, virtual machines, machine images, drivers, executable files, and other software-based programs capable of being run, executed, or otherwise used by the respective devices. Each mobile device can include at least one graphical display and user interface allowing a user to view and interact with applications and other programs of the mobile device. In a particular embodiment, driver mobile devices may be a hardened device that is configured to only run a taxi driver application using a specialized operating system (e.g., a modified version of Android). In one embodiment, a taxi service may issue or other facilitate the provision of hardened devices to its drivers, but restrict the functionality of the devices to the taxi driver application (i.e., the devices may be locked down so as not to allow the installation of additional applications).

In various embodiments, a driver mobile device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations or driver destination locations) to the self-driven vehicle. Accordingly, as used herein "driver" may refer to a human being that may physically drive or otherwise control movement of a vehicle or the vehicle itself (e.g., in the case of a self-driven vehicle) or component thereof (e.g., mobile device application 108 or logic therein).

In particular embodiments, a taxi passenger application runs on passenger mobile devices 104. The application may allow a user to enter various account information to be utilized by a taxi service. For example, the account information may include a user name and password (or other login credentials), contact information of the user (e.g., phone number, home address), payment information (e.g., credit card numbers and associated information), or car preference information (e.g., what models or color of car the user prefers).

The application may allow a user to request a ride from the taxi service. In various embodiments, the application may establish a pick-up location automatically or based on user input (e.g., locations may include the current location of the mobile device 104 as determined by a global positioning system (GPS) of the mobile device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger mobile device 104. Any suitable information about the potential driver(s) may be sent to the mobile device 104 either before or after the selection of the driver by the passenger, such as a location of a driver, an estimated pick-up time, a type of car used by a driver, the merchandise available in the car, a driver rating or comments made by other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the mobile device 104 and the route to be taken. Upon completion of the ride, the application may provide the passenger the ability to rate the driver or provide comments about the driver.

In particular embodiments, a taxi driver application runs on driver mobile devices 108. The application may allow a driver to enter various account information to be utilized by a taxi service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the taxi service. The application may periodically transmit the current location of the mobile device 108 as determined by a GPS of the mobile device 108 to the backend system 116. When a driver is selected to provide a ride, backend system 116 may send a notification to the taxi driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

When a ride is accepted, the application may navigate the driver to the passenger. The application may also provide contact information for the passenger and/or the ability to contact the passenger through the application (e.g., via a phone call or text). The application may also navigate the driver to the passenger's destination once the ride begins. Upon completion of the ride, the application may provide the driver the ability to rate the passenger or provide comments about the passenger.

System 100 may include one or more application servers 112 coupled to the mobile devices through one or more networks 120. The taxi passenger application and taxi driver application may be supported with, downloaded from, served by, or otherwise provided through an application server 112 or other suitable means. In some instances, the applications can be downloaded from an application storefront onto a particular mobile device using storefronts such as Google Android Market, Apple App Store, Palm Software Store and App Catalog, RIM App World, etc., as well as other sources. In various embodiments, the taxi passenger application and taxi driver application may be installed on their respective devices in any suitable manner and at any suitable time. As one example, a taxi passenger application may be installed on a mobile device as part of a suite of applications that are pre-installed prior to provision of the mobile device to a consumer. As another example, a taxi driver application may be installed on a mobile device by a taxi service (or an entity that provisions mobile devices for the taxi service) prior to the issuance of the device to a driver that is employed or otherwise associated with the taxi service.

As described above, applications utilized by mobile devices 104 and 108 can make use of a backend system 116. Backend system 116 may comprise any suitable servers or other computing devices that facilitate the provision of a taxi service as described herein. For example, backend system 116 may receive a request from a passenger and facilitate the assignment of a driver to fulfill the request. Backend system 116 is described in more detail in connection with FIG. 3.

In general, "servers," and other "computing devices" may include electronic computing devices operable to receive, transmit, process, store, or manage data and information associated with system 100. As used in this document, the term "computing device," is intended to encompass any suitable processing device. For example, the system 100 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including taxi service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the mobile devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
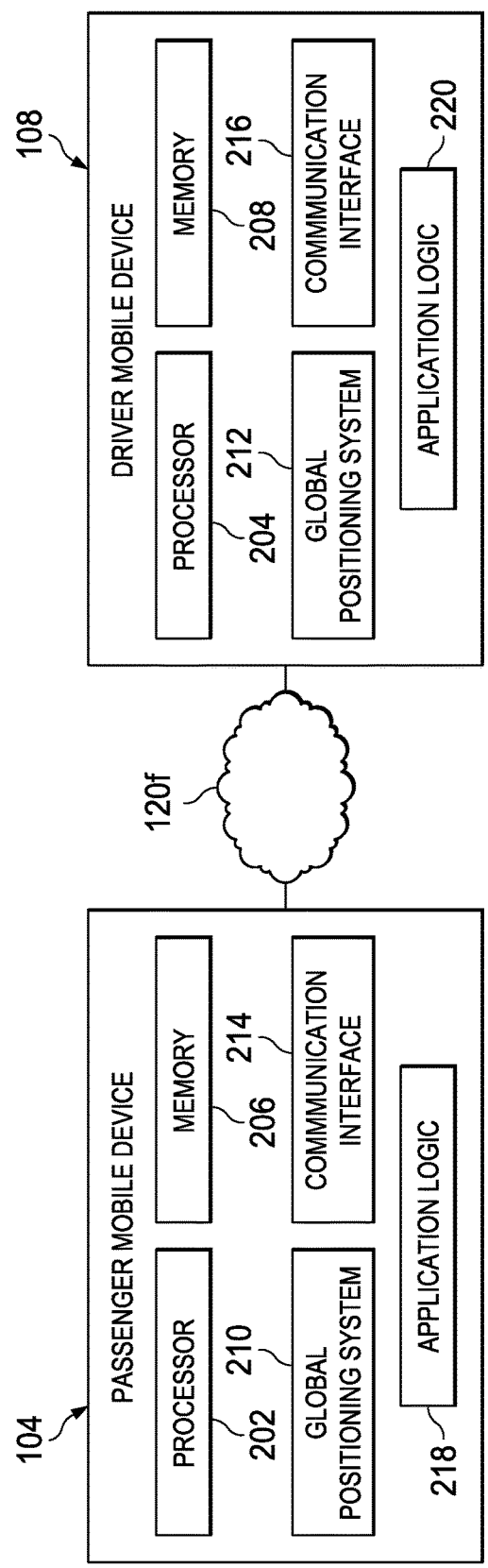
FIG. 2 illustrates a block diagram of a passenger mobile device and a driver mobile device of the system of FIG. 1 in accordance with certain embodiments.

FIG. 2 illustrates a block diagram of a passenger mobile device 104 and a driver mobile device 108 of the system of FIG. 1 in accordance with certain embodiments. In the embodiment shown, the devices may be communicatively coupled through network 120*f* which may include any suitable intermediary nodes, such as a backend system 116.

In the embodiment depicted, mobile devices 104 and 108 each include a computer system to facilitate performance of their respective operations. In particular embodiments, a computer system may include a processor, storage, and one or more communication interfaces, among other components. As an example, mobile devices 104 and 108 each include one or more processors 202 and 204, memory elements 206 and 208, and communication interfaces 214 and 216, among other hardware and software. These components may work together in order to provide functionality described herein.

Processors 202 and 204 may be a microprocessor, controller, or any other suitable computing device, resource, or combination of hardware, stored software and/or encoded logic operable to provide, either alone or in conjunction with other components of mobile devices 104 and 108, the functionality of these mobile devices. In particular embodiments, mobile devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by mobile devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between mobile devices 104 and 108 and one or more networks (e.g., 120*f*) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective mobile devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Application logic 218 may include logic providing, at least in part, the functionality of the taxi passenger application described herein. Similarly, application logic 220 may include logic providing, at least in part, the functionality of the taxi driver application described herein. In a particular embodiment, the logic of devices 104 and 108 may include software that is executed by processor 202 and 204. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In various embodiments of the present disclosure, in addition to any combination of the features described above with respect to the taxi driver application, application logic 220 may provide additional features for the taxi driver application to enhance a driver's experience.

In various embodiments, the taxi driver application allows a driver to indicate a destination location. The destination location may represent an intended destination of the driver. For example, the destination location may be a location that the driver desires to travel to after completing one or more passenger routes. The destination location may be specified in any suitable format, such as GPS coordinates, street address, establishment name (e.g., LaGuardia Airport, Central Park, etc.), or other suitable format. In one example, the destination location corresponds to the residence of the driver. In other embodiments, the destination location may be any other suitable location specified by the driver. In some embodiments, the destination location may be entered in an ad hoc manner. For example, on a particular day, the driver may have a doctor's appointment or lunch meeting and may specify the doctor's office or restaurant as the destination location. In other embodiments, a particular destination location (e.g., the location of the driver's residence) may be stored as a default destination location that is used unless the drive overrides the default destination location with a different destination location. In various embodiments, commonly used locations may be stored by driver mobile device 108. Application logic 220 may also provide a search function to allow the driver to search for the destination location based on one or more keywords or characteristics (e.g., the name of an establishment). In particular embodiments, application logic 220 may be configured (e.g., by the driver) to automatically accept requests from a passenger that has a route with a destination location that would bring the driver closer to the driver's destination location.

In various embodiments, the driver may specify that from a particular time onwards (e.g., immediately upon specification by the driver, at a time scheduled by a driver such as 4:30 PM, or at an optimum time determined by the backend system 116 based on current and/or historical passenger conditions) he desires to only take routes that will bring him closer to the destination location. In some embodiments, the driver may specify a time associated with arrival at the destination location. For example, the time may be a time before which the driver desires to arrive at the destination location or a target time for arriving at the destination location (which could be specified as a single time or a time range). In various embodiments, the driver may enter a time that may apply to multiple different days, such as a default time. For example, the driver may specify that he wishes to be home by 6:00 PM each day. In particular embodiments, the driver may also specify a time in an ad hoc manner, e.g., by specifying that he needs to be at a doctor's appointment by noon on a particular day. In a particular embodiment, application logic 220 may provide or sync with a calendar (e.g., a Google Calendar or Microsoft Outlook calendar) associated with the driver and may derive destination locations and/or times that the driver needs to be at the destination locations based on calendar entries. In various embodiments, a calendar entry may be used to present a prospective location and/or time to the driver, which the driver may then select as the destination location and/or associated time. In other embodiments, the driver mobile application may automatically select a location and/or time from a calendar entry as the destination location and/or time without driver intervention. In various embodiments, commonly used times may be stored by driver mobile device 108. In particular embodiments, application logic 220 may be configured (e.g., by the driver) to automatically accept requests from a passenger that has a route that would allow the driver to transport the passenger and still arrive at the driver's destination location by the specified time.

In some situations, a first driver may share a vehicle with a second driver. In such cases, near the end of the shift of the first driver, the driver destination location and associated arrival time may be set (e.g., in an ad hoc manner or automatically based on information regarding the shift schedule provided to the driver mobile device 108 and/or backend system 116) to the pick-up location of the second driver and the end of the first driver's shift respectively.

The driver may also specify whether he is willing to consider exceptions, that is, routes that may result in the driver arriving late to the destination location and/or routes that may take the driver further from the destination location. For example, the driver may specify that he is willing to accept a customer that would make the driver late or take the driver further from the destination location if the estimated fare for the customer's route is above a particular threshold. As another example, the driver may specify that he is willing to accept a customer with a route that would result in the driver arriving at the destination location within a specified threshold of time after the time specified by the driver (e.g., no more than 5 minutes late) or that would result in taking the driver further from the destination location by a threshold distance (e.g., no more than 5 miles). Alternatively, the driver may specify that he is not willing to be late to the destination location and/or to travel further from the destination. When an exception is triggered, the driver may be notified of the details of the exception (e.g., a fare amount of the prospective route, an estimated arrival time at the destination location taking into consideration the passenger's route, or an estimated distance increase to the destination location due to the passenger's route). In some embodiments, the driver may select to forego notification of the exception.

Application logic 220 may cause the criteria (e.g., destination location, specified times, exceptions, and other associated information) to be communicated to backend system 116 so that the backend system can direct the driver towards a passenger that has a route that is closer to the driver's destination location and/or would enable the driver to fulfill the route and/or arrive at the driver's destination location on time. In particular embodiments, if a passenger satisfying the criteria is not immediately available, the driver may be directed to a passenger pick-up region selected by the backend system 116 to optimize the chance of the driver being assigned a passenger that satisfies the driver's criteria. The backend system is explained in more detail in connection with FIG. 3.

Figure 3:
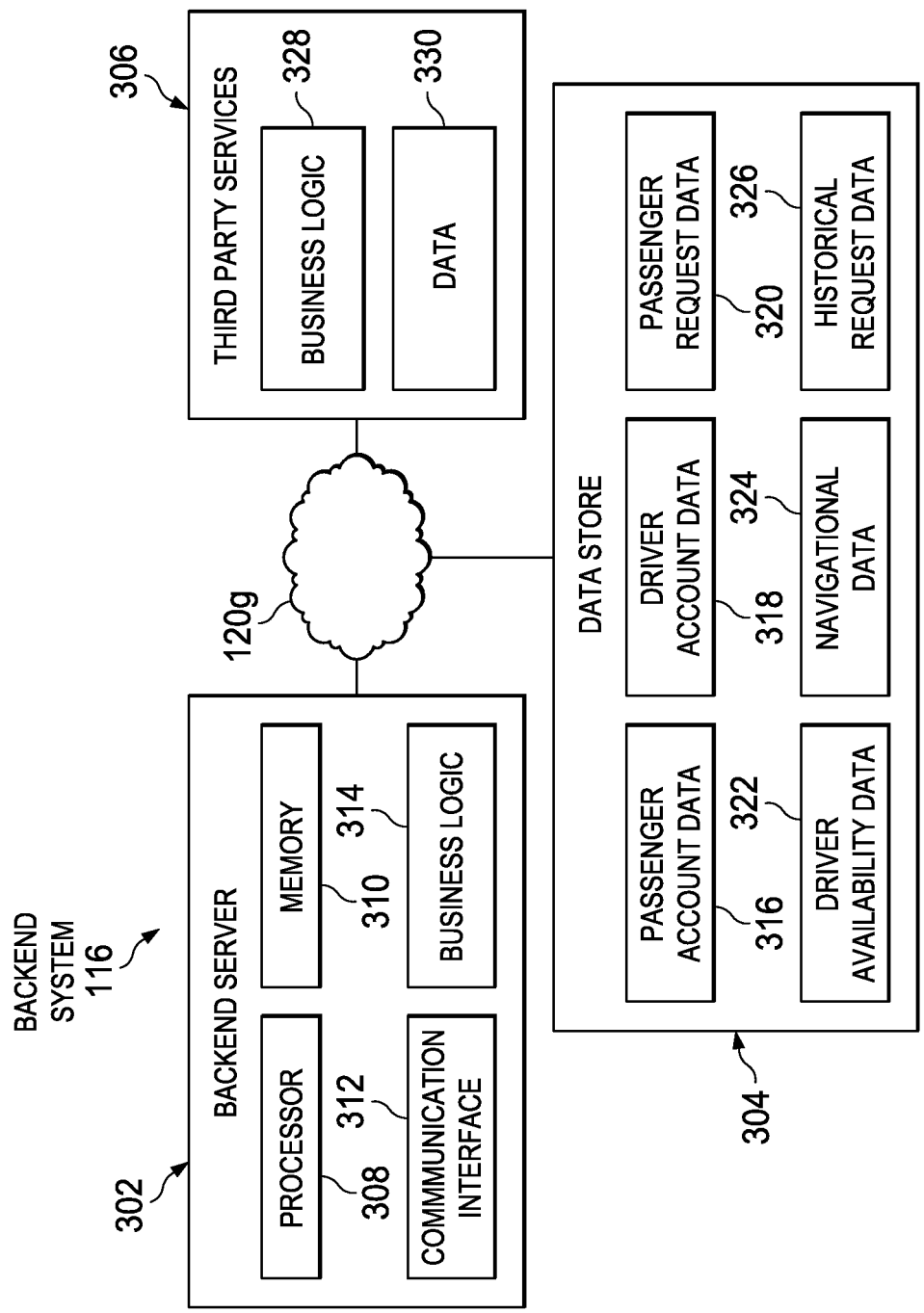
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the taxi service described herein. In the embodiment depicted, backend system includes backend server 302, data store 304, and third party services 306 coupled by network 120g. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers.

In the embodiment depicted, backend server 302 include a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., mobile devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the taxi service. Data store 304, may store any suitable data associated with the taxi service in any suitable format(s). For example, data store 304 may include one or more database management systems (DBMS), such as SQL Server, Oracle, Sybase, IBM DB2, or NoSQL data bases (e.g., Redis and MongoDB).

In the embodiment depicted, data store 304 includes passenger account data 316, driver account data 318, passenger route data 320, driver availability data 322, navigational data 324, and historical route data 326. The various data may be updated at any suitable intervals.

Passenger account data 316 may include any suitable information associated with passenger accounts, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of passenger requests (whereby the backend server 302 may assign a passenger request to the driver without waiting for the driver to indicate acceptance of a request), or other suitable information.

Passenger request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of passenger requests, or other suitable information.

Navigational data 324 may comprise information supporting navigation functions provided by the taxi passenger applications and driver passenger applications. For example, navigational data 324 may comprise map data that may be sent to passenger mobile devices 104 and driver mobile devices 108 to allow the devices to display maps and associated indicators (e.g., location of passenger(s), location of driver(s), desired routes, etc.) In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the passenger request data 320 as well as any combination of additional data such as the time at which the destination location was reached, the total time of the trip, the total fare, a rating given by the passenger to the driver or by the driver to the passenger for the trip, or other suitable information associated with the trip.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or mobile devices 104 and 108 and provide responses to the requests.

Backend server 302 may be in communication with each passenger mobile device 104 and each driver mobile device 108 that is utilizing the taxi service at a particular time. Backend server may store information received from the mobile devices 104 and 108 in data store 304. Backend server 302 may also receive and respond to requests made by mobile devices 104 and 108 by processing information retrieved from data store 304.

When a passenger opens the taxi passenger application, the backend server 302 may log the passenger in based on a comparison of authentication information provided by the passenger mobile device 104 with authentication information stored in passenger account data 316. The passenger may then request a ride. The request is received by the backend server 302 and stored in passenger request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his mobile device 108. If the driver rejects the request, backend server 302 selects a different driver and the process is repeated until the backend server 302 receives an accepted request from a driver. In another embodiment, backend server 302 may select a plurality of drivers that may fulfill a passenger's request and allow the passenger to select one of the drivers. The backend server 302 may proceed to notify the driver of the request in a similar manner to that described above. In yet another embodiment, backend server 302 may select a plurality of drivers that may fulfill a passenger's request and notify each driver of the passenger's request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the passenger's request).

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information to the driver mobile device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304.

In various embodiments, backend server 302, in conjunction with a mobile device 108, may enhance a driver's experience by allowing the driver to specify a destination location to which the driver desires to travel in connection with the transportation of passengers and selecting passengers for the driver based on the destination location specified by the driver.

As described earlier, a driver may use taxi driver application to specify driver destination information such as a destination location and/or scheduled arrival time or other information associated with the destination location and/or scheduled arrival time. In various embodiments, the driver may also specify when the driver destination information should be applied against passenger requests that may be fulfilled by the driver. For example, the driver may specify that the driver destination information should be applied immediately. As another example, the driver may specify that the driver destination information should be applied starting at 4:00 each day (e.g., the driver may desire to be at his residence by 5:00 each day). In other embodiments, the backend sever 302 may determine when the driver destination information should be applied based on historical and/or current passenger request and/or navigational data. In various embodiments, the driver destination information and/or the applicable timeframe in which the driver destination information should be applied to passenger requests may be stored in driver account data 318 and/or driver availability data 322. Backend server 302 may use the driver destination information in conjunction with information about passenger requests to select a passenger for the driver.

In one embodiment, backend server 302 may omit the sending of passenger requests to the driver if the requests do not conform to the driver destination information. For example, if the destination location of the passenger request has not been provided or does not bring the driver closer to the driver's destination location (e.g., as measured either from the driver's current location or the pick-up location of the passenger) or if the estimated time of arrival at the destination location for the driver after fulfilling the passenger's request is after the specified arrival time in the driver destination information, then the backend server 302 may send the passenger request to a different driver (e.g., even if the driver is closer to the passenger's pick-up location than the different driver is). Alternatively, backend server 302 may determine that the trip would take the driver further from his destination location and/or not allow the driver to make it to his destination location by the specified time, but that an exception should be made based on the expected fare of the request, magnitude of distance deviation from the destination location of the driver, magnitude of expected tardiness to the destination location, or other criteria included in the driver destination information. In various embodiments, if an exception is made, the backend server 302 may send the request to the driver along with a notification explaining the details of the driver destination information that are not met and/or the details of the exception that has been triggered.

In some embodiments, if a passenger request matching the driver destination information is not immediately available, backend server 302 may direct the driver to a passenger pick-up region based on a determined probability that passenger requests matching the driver destination information will materialize in the passenger pick-up region. For example, the backend server 302 may direct the driver towards an airport or district of a city that includes a high concentration of commuters, resulting in a higher likelihood that the driver will receive a request for a ride which will take the driver closer to his destination.

In various embodiments, backend server 302 may utilize current and/or historical passenger request data and/or driver availability data 322 (e.g., data retrieved from 320 or 326) to determine the passenger pick-up region. For example, backend server 302 may calculate, for several regions near the driver, a likelihood of the driver receiving a passenger request that matches the driver destination information based on any suitable information, such as the historical number of passenger requests matching the driver destination information at or near the time the driver would arrive in the particular region, the current number of passenger requests matching the driver destination information, the current number of available drivers in the region, or other suitable information.

The backend server 302 may seek to optimize the revenue earned by the driver on his trip towards the destination location. As one example, the backend server 302 may select the passenger pick-up region based at least in part on an average expected fare of one or more passenger requests originating in the passenger pick-up region. The expected fare may be calculated using historical and/or current passenger request data. In various embodiments, the likelihood of receiving a passenger request matching the driver destination information may be combined with the average expected fare to determine the attractiveness of the particular region with respect to other regions.

In some embodiments, in order to facilitate the selection of passenger pick-up regions for drivers, the backend server 302 may divide a particular area into a plurality of regions and may determine, for each region, an estimated frequency of passenger requests for a trip from that region to each of the other regions. Each of these frequencies may be associated with a particular time. For example, the estimated frequency of passenger requests between a first region and a second region may be greater at a first time (e.g., 5:00 PM) as compared to the estimated frequency at a second time (e.g., 7:00 PM). The frequencies may be based on historical and/or current information regarding passenger requests. In various embodiments, such information may be combined with expected fares between the regions to determine the attractiveness of a particular pick-up region.

In various embodiments, an analysis factoring in the possibility of multiple passenger requests being fulfilled by the driver prior to arriving at the destination location may be performed by backend server 302 to determine the passenger pick-up region. For example, the attractiveness of a particular region may be determined based on the likelihood that the driver could fulfill one or more additional passenger requests matching the driver destination information after fulfilling a first request from the particular region. As one example, a first region may be selected as attractive if there is a relatively high chance the driver will receive a request for a ride from the first region to a second region and there is a relatively high chance of receiving a request for a ride from the second region to the driver's destination. In general, the system may base the attractiveness of a particular region based on the probability of the driver receiving requests for any number of rides that will bring the driver closer to his destination and/or allow the driver to reach his destination on time. After each ride is complete (or at any other suitable time), the system may perform an updated analysis based on real time and/or historical conditions and may select a new pick-up region if the region the driver is in does not include a readily available passenger and a new pick-up region is more attractive (which analysis may also take into account any time the driver would lose by travelling to the updated pick-up region). In a particular embodiment, the system may design a design a multi-hop route for the driver based on relatively high probabilities that the driver will be able to pick-up a passenger at each hop (i.e., pick-up region) and travel towards the destination location and/or arrive at the destination location on time. In various embodiments, the multi-hop route may be selected based at least in part on an expected revenue for the driver's trip. For example, the system may direct the driver to an airport in a first region and predict that the driver will be able to transport a passenger to a second region that is closer to the driver's destination location, and then transport another passenger from the second region to a region that includes (or is near) the driver's destination location.

Figure 4:
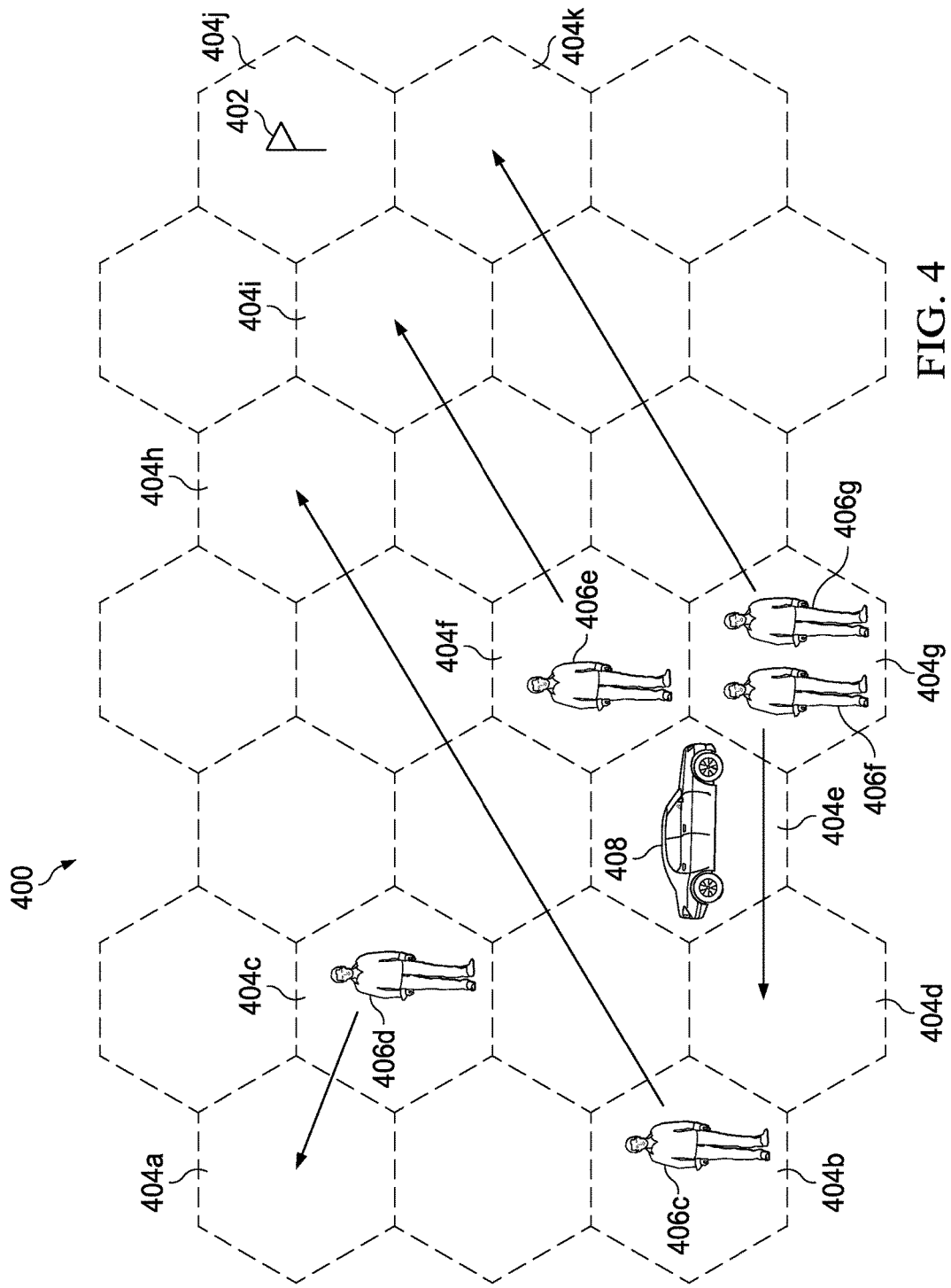
FIG. 4 illustrates a diagram of a plurality of passenger pick-up regions in accordance with certain embodiments.

FIG. 4 illustrates a diagram 400 of a plurality of passenger pick-up regions 404 in accordance with certain embodiments. Although the passenger pick-up regions 404 are depicted as hexagonal regions each having the same area, other embodiments may include passenger pick-up regions with any suitable geographical delineations. In the embodiment depicted, a driver 408 is located in region 404e. In this example, the driver has indicated a destination location 402 within region 404j. The embodiment also depicts a plurality of passengers 406 that have submitted passenger requests to travel to destination locations indicated by the endpoint of the arrows associated with the passengers.

If the driver destination information merely specifies that the driver desires to take routes that bring him towards his destination location, the passenger requests from passengers 406c, 406e, and 406g may be considered to match the driver destination information and one or more of these passenger requests may be provided to the driver (assuming they are not first accepted by a different driver) who may accept or reject the request(s). In such a situation, the backend server 302 may determine that the passenger requests associated with passengers 406d and 406f should not be presented to the driver (unless an exception is met).

If the driver destination information specifies that the driver 408 desires to arrive at destination location 402 by a particular time, then each of the routes may be analyzed to determine whether the driver may fulfill the route and still arrive at the destination location 402 before the specified time. As one example, the routes associated with passengers 406e and 406g may allow the driver to arrive at destination location 402 on time, while the other routes do not (even though the route associated with passenger 406*c* would bring the driver closer to the destination location 402). Accordingly, one or both of these passenger requests may be presented to the driver. In some embodiments, if multiple passenger requests match the driver destination information and are available for fulfillment by the driver (i.e., not accepted by another driver), the passenger request with the greater expected fare may be selected for the driver. In alternative embodiments, the passenger request that would result in the greatest expected value of a driver's trip towards the destination location (e.g., considering the possibility of picking up one or more additional passengers after arriving at the destination location of the first passenger's request) may be selected for the driver.

Figure 5:
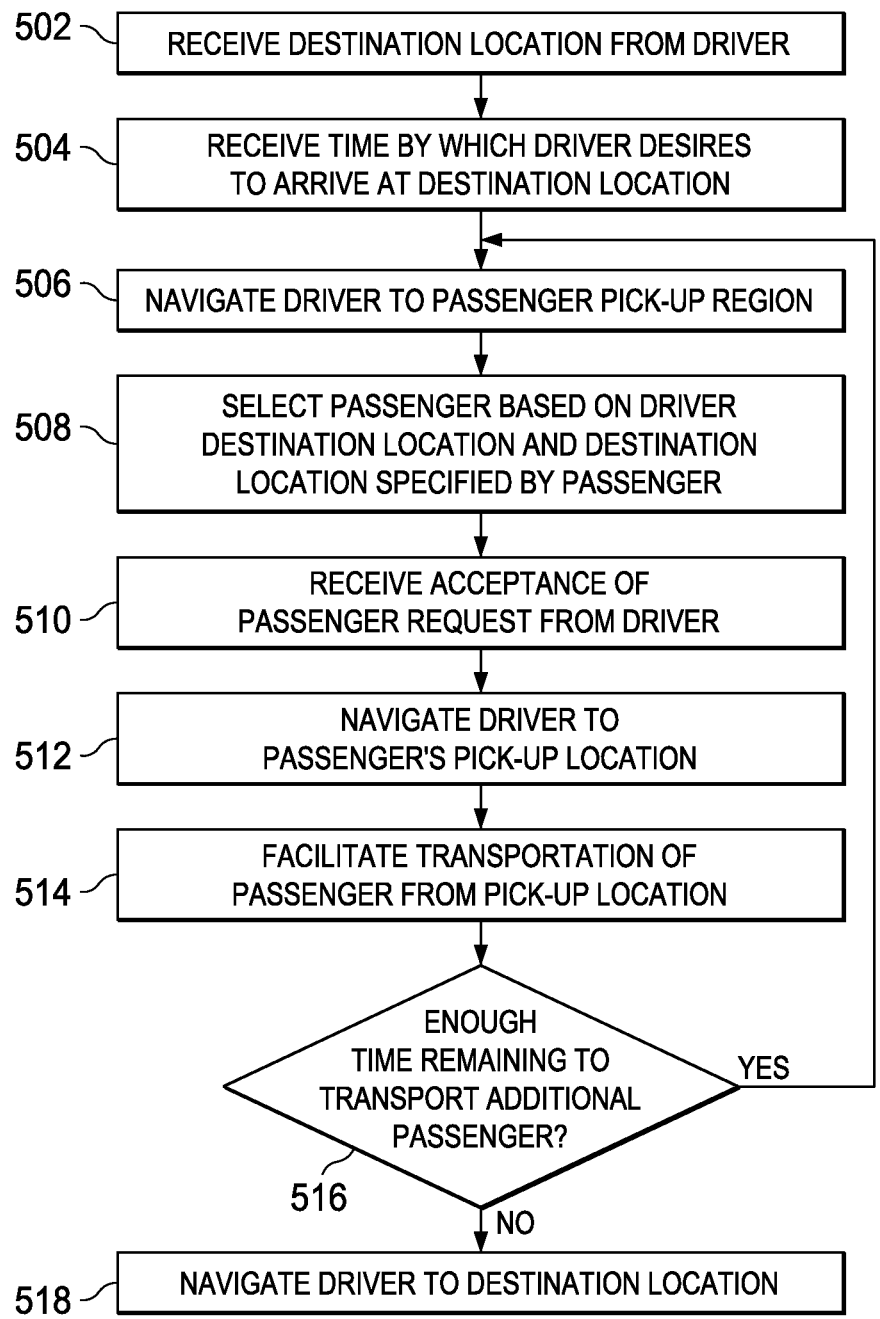
FIG. 5 illustrates a method for directing a driver to a passenger based on the driver's final destination in accordance with certain embodiments.

FIG. 5 illustrates a method 500 for directing a driver to a passenger based on the driver's destination location in accordance with certain embodiments. At step 502, a destination location is received from a driver. At step 504, a time by which the driver desires to arrive at the destination location is received. In some embodiments, the destination location and the associated time may be received by a driver mobile device 108 and forwarded by the device to a backend server 302.

At step 506, the driver is navigated to a passenger pick-up region. The passenger pick-up region may be selected using any suitable information such as the likelihood that a passenger request matching the driver destination information will materialize and/or expected revenue potential from passenger requests originating from the passenger pick-up region. At step 508, a passenger is selected based on the driver destination location and a destination location specified by a passenger in a passenger request. For example, the passenger may be selected based on a determination that the passenger's destination location would bring the driver closer to the driver's destination location or that the passenger's destination location would allow the driver to fulfill the passenger's request and still arrive at the driver's destination location before the time specified by the driver.

At step 510, and acceptance of the passenger request is received from the driver. In one embodiment, the driver may interact with the driver mobile device 108 to accept the request and the acceptance is then sent to the backend server 302. In another embodiment, the driver may have previous arranged to automatically accept requests in which case the driver mobile device 108 may send an acceptance to the backend server 302 without further interaction by the driver or (if the backend server has received notification of the driver's intention to automatically accept requests matching certain criteria) the backend server may automatically assign the request to the driver without receiving an indication of acceptance from the driver mobile device 108.

At steps 512 and 514, the driver is navigated to the passenger's pick-up location and transportation of the passenger from the pick-up location to the passenger's destination location is facilitated. For example, these steps may be performed by driver mobile device 108 and/or backend server 302.

At step 516, the backend server 302 may determine whether there is enough time for the driver to transport an additional passenger while still arriving at the destination location before the specified time. If a positive determination is made, the driver is navigated to a passenger pick-up region 506 (or directly to a passenger pick-up location if a passenger is immediately available) and various steps are repeated. If a negative determination is made at step 516, the driver may be navigated to the driver's destination location at step 518.

Some of the steps illustrated in FIG. 5 may be repeated, combined, modified or deleted where appropriate, and additional steps may also be included. Additionally, steps may be performed in any suitable order without departing from the scope of particular embodiments.

It is also important to note that the steps in FIG. 5 illustrate only some of the possible scenarios that may be executed by, or within, the various components of the system described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 116, may, in various embodiments, be performed by any combination of one or more passenger mobile devices 104 or driver mobile devices 108 where appropriate. Similarly, certain functionality described herein as being performed by a passenger mobile device 104 or a driver mobile device 108 may, in various embodiments, be performed by backend server 116 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving, by a processing device over a network from a driver computing device associated with a taxi service, a driver destination location, wherein the driver computing device is to arrive at the driver destination location after transporting one or more passengers;
   selecting a passenger pick-up region based on historical data indicating a likelihood of the driver computing device receiving a request to pick up, in the passenger pick-up region, a passenger with a corresponding passenger destination location that is closer to the driver destination location than a distance between the passenger pick-up region and the driver destination location; and
   subsequent to directing the driver computing device to the passenger pick-up region, providing, by the processing device over the network to the driver computing device, a passenger pick-up location of a first passenger that corresponds to a first request.

2. The method of claim 1 further comprising selecting the first request of a plurality of requests for the taxi service based on a determination that a first distance between the corresponding passenger destination location of the first passenger and the driver destination location is less than a second distance between the passenger pick-up location and the driver destination location.

3. The method of claim 1 further comprising selecting the first request of a plurality of requests for the taxi service based on an estimation that the driver computing device reaches the driver destination location by a scheduled time indicated by the driver computing device after completing transportation of the first passenger from the passenger pick-up location to the corresponding passenger destination location specified by the first passenger.

4. The method of claim 3, wherein the scheduled time is derived from regular working hours specified by the driver computing device and the driver destination location is a residence of a driver corresponding to the driver computing device.

5. The method of claim 3, further comprising:
transmitting, by the processing device via the network to the driver computing device, a notification that transportation of the first passenger is to result in the driver computing device not being able to reach the driver destination location before the scheduled time; and
receiving a second indication from the driver computing device of acceptance of the first request.

6. The method of claim 1 further comprising selecting the first passenger based on an estimated fare for transporting the first passenger from the passenger pick-up location to the corresponding passenger destination location specified by the first passenger.

7. The method of claim 1, wherein the directing of the driver computing device to the passenger pick-up region is further based on a probability of a prospective passenger requesting transportation from the passenger pick-up region.

8. The method of claim 1, wherein the selecting of the passenger pick-up region is further based on second historical data indicating a second likelihood of the driver computing device arriving at the driver destination location by a scheduled arrival time indicated by the driver computing device after completing transportation of a passenger from the passenger pick-up region to a corresponding passenger destination location.

9. The method of claim 1 further comprising:
receiving, by the processing device from the driver computing device, an indication of a time that the driver destination location is to be applied against requests; and
in response to determining that a current time corresponds to the time that the driver destination location is to be applied, selecting the first request of a plurality of requests for the taxi service based on the driver destination location and the corresponding passenger destination location.

10. The method of claim 1, wherein the selecting of the passenger pick-up region is further based on second historical data comprising fares of routes taken by passengers from the passenger pick-up region.

11. The method of claim 1, wherein the passenger pick-up region is a first pick-up region and the corresponding passenger destination location specified by the first passenger is located within a second pick-up region of a route comprising multiple pick-up regions selected based on a second likelihood of the driver computing device to receive requests to transport passengers from each pick-up region.

12. The method of claim 1, wherein the driver destination location is selected based on a calendar entry associated with the driver computing device.

13. An apparatus comprising:
a memory; and
a processing device communicably coupled to the memory, the processing device configured to execute instructions to:
receive, by the processing device over a network from a driver computing device associated with a taxi service, a driver destination location, wherein the driver computing device is to arrive at the driver destination location after transporting one or more passengers;
select a passenger pick-up region based on historical data indicating a likelihood of the driver computing device receiving a request to pick up, in the passenger pick-up region, a passenger with a corresponding passenger destination location that is closer to the driver destination location than a distance between the passenger pick-up region and the driver destination location; and
subsequent to directing the driver computing device to the passenger pick-up region, provide, by the processing device over the network to the driver computing device, a passenger pick-up location of a first passenger that corresponds to a first request.

14. The apparatus of claim 13, wherein the processing device further executes instructions to select the first request of a plurality of requests for the taxi service based on a determination that a first distance between the corresponding passenger destination location of the first passenger and the driver destination location is less than a second distance between the passenger pick-up location and the driver destination location.

15. The apparatus of claim 13, wherein the processing device further executes instructions to select the first request of a plurality of requests for the taxi service based on an estimation that the driver computing device reaches the driver destination location by a scheduled time indicated by the driver computing device after completing transportation of the first passenger from the passenger pick-up location to the corresponding passenger destination location specified by the first passenger.

16. The apparatus of claim 13, wherein directing the driver computing device to the passenger pick-up region is further based on a probability of a prospective passenger requesting transportation from the passenger pick-up region.

17. A computer-readable non-transitory medium storing one or more instructions which, when executed by a processing device, cause the processing device to:
receive, over a network from a driver computing device associated with a taxi service, a driver destination location, wherein the driver computing device is to arrive at the driver destination location after transporting one or more passengers;
select a passenger pick-up region based on historical data indicating a likelihood of the driver computing device receiving a request to pick up, in the passenger pick-up region, a passenger with a corresponding passenger destination location that is closer to the driver destination location than a distance between the passenger pick-up region and the driver destination location; and
subsequent to directing the driver computing device to the passenger pick-up region, provide, by the processing device over the network to the driver computing device, a passenger pick-up location of a first passenger that corresponds to a first request.

18. The computer-readable non-transitory medium of claim 17, wherein the processing device is further configured to select the first passenger based on a determination that a first distance between the corresponding passenger destination location of the first passenger and the driver destination location is less than a second distance between the passenger pick-up location and the driver destination location.

19. The computer-readable non-transitory medium of claim 17, wherein the processing device is further configured to select the first passenger based on an estimation that the driver computing device is to reach the driver destination location by a scheduled time indicated by the driver computing device after completing transportation of the first passenger from the passenger pick-up location to the corresponding passenger destination location specified by the first passenger.

20. The computer-readable non-transitory medium of claim 17, wherein directing the driver computing device to the passenger pick-up region is further based on a probability of a prospective passenger requesting transportation from the passenger pick-up region.

* * * * *